Nov. 23, 1965    N. McNIEL    3,218,774
HOLLOW REINFORCED CONCRETE BUILDING PANEL
Filed Sept. 28. 1961    11 Sheets-Sheet 1

INVENTOR
Nixon McNiel,
BY Diggins & LeBlanc
ATTORNEYS

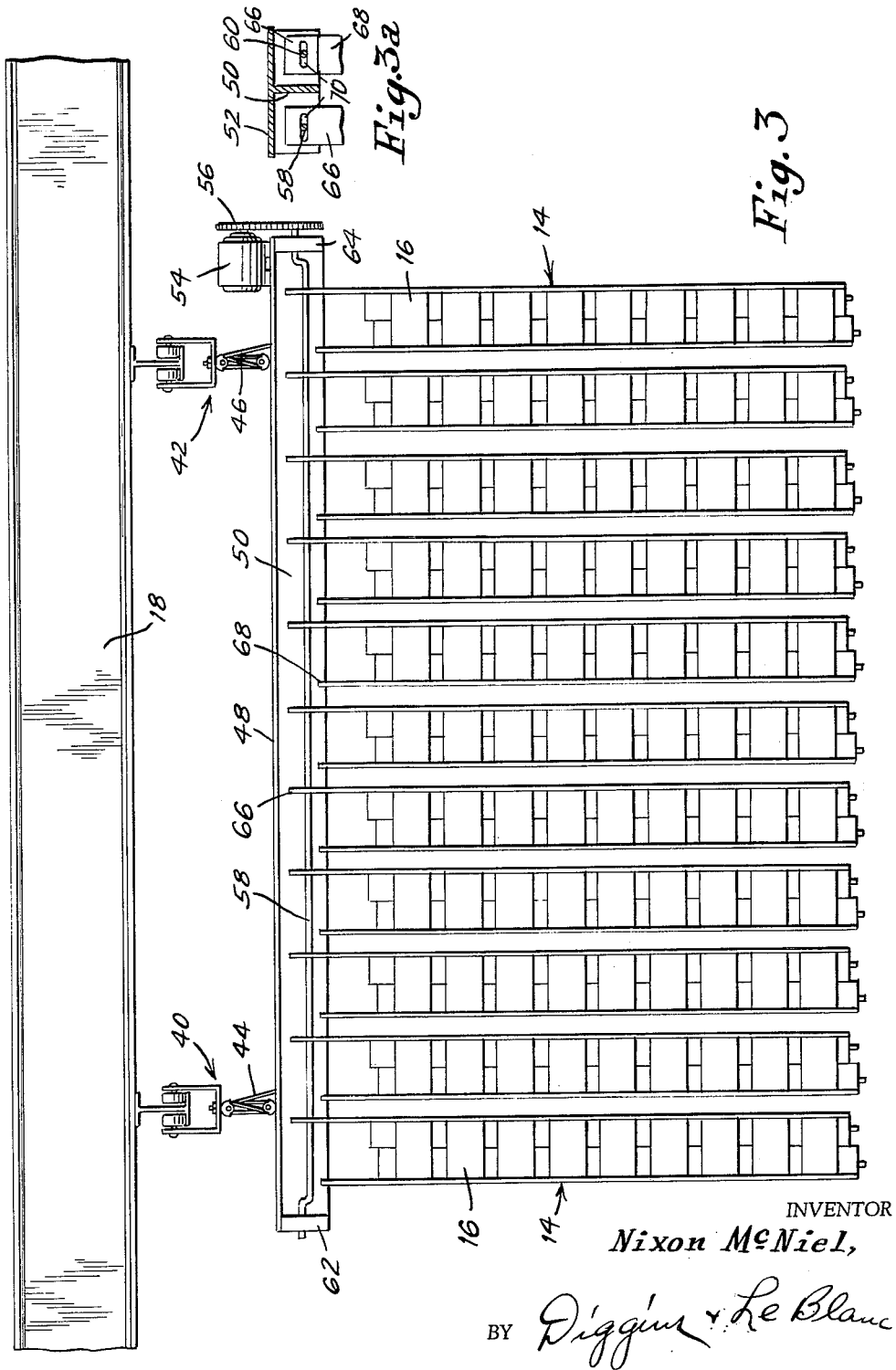

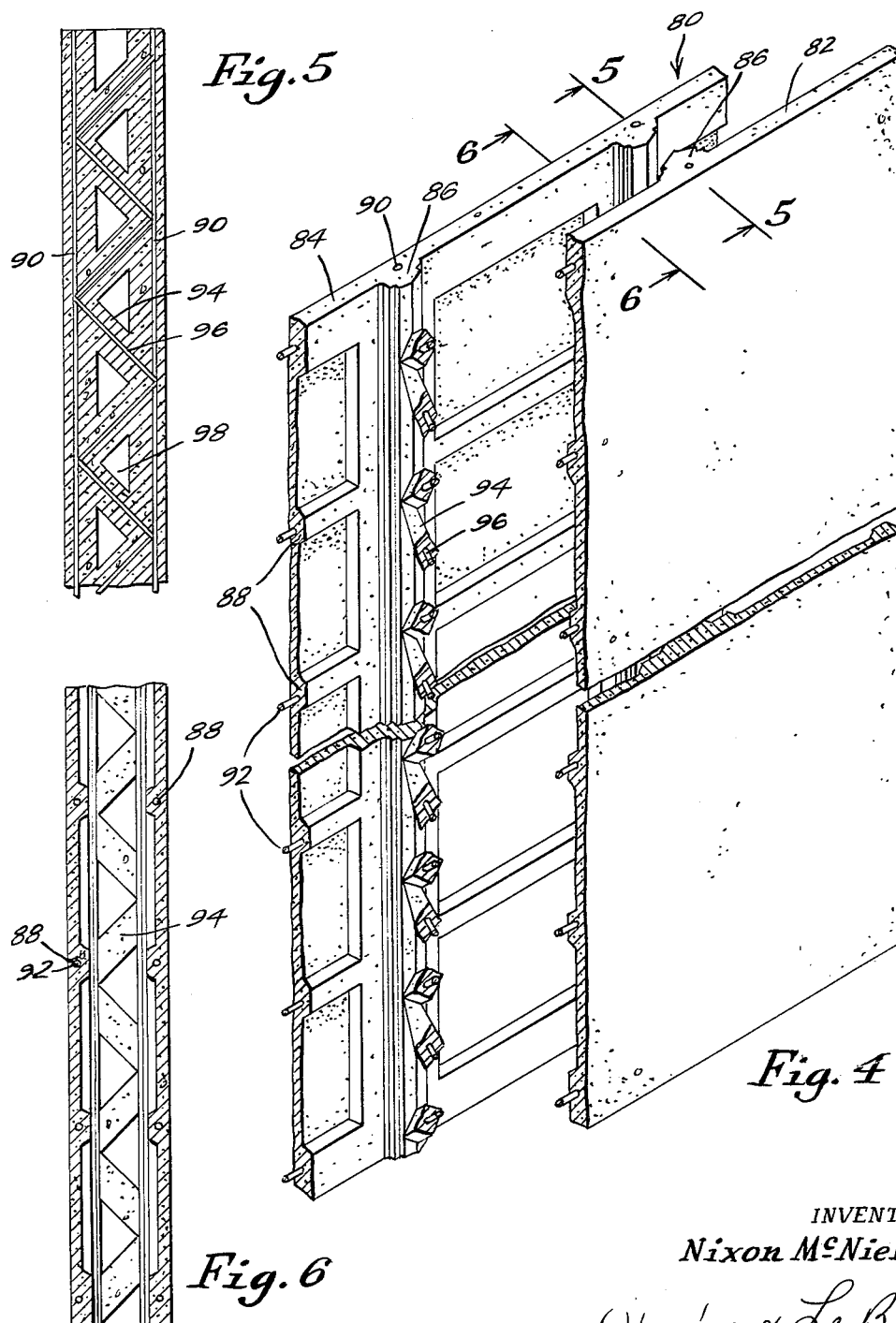

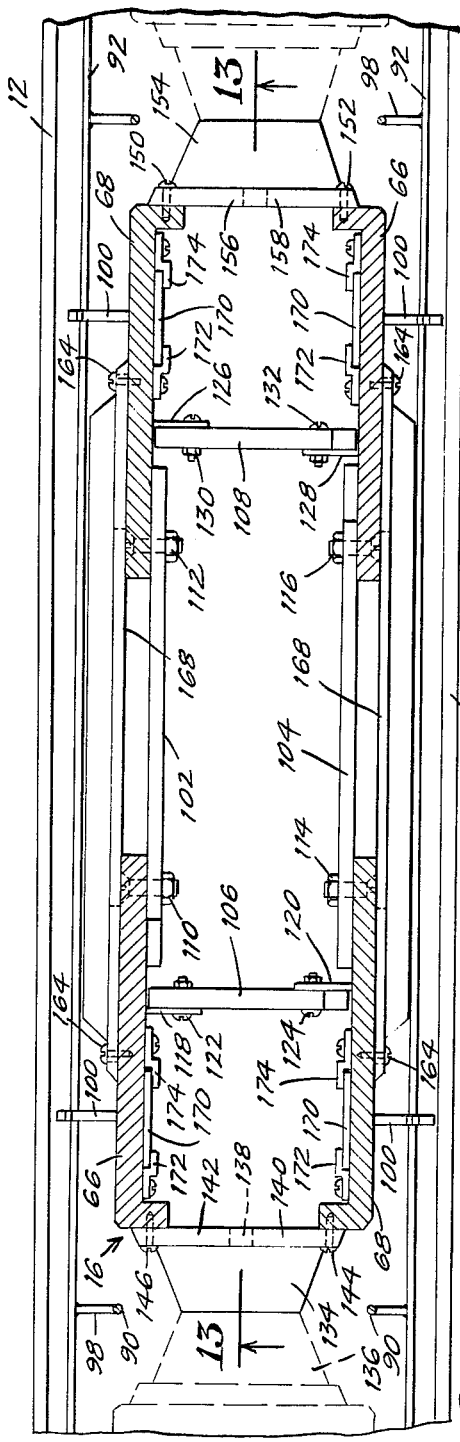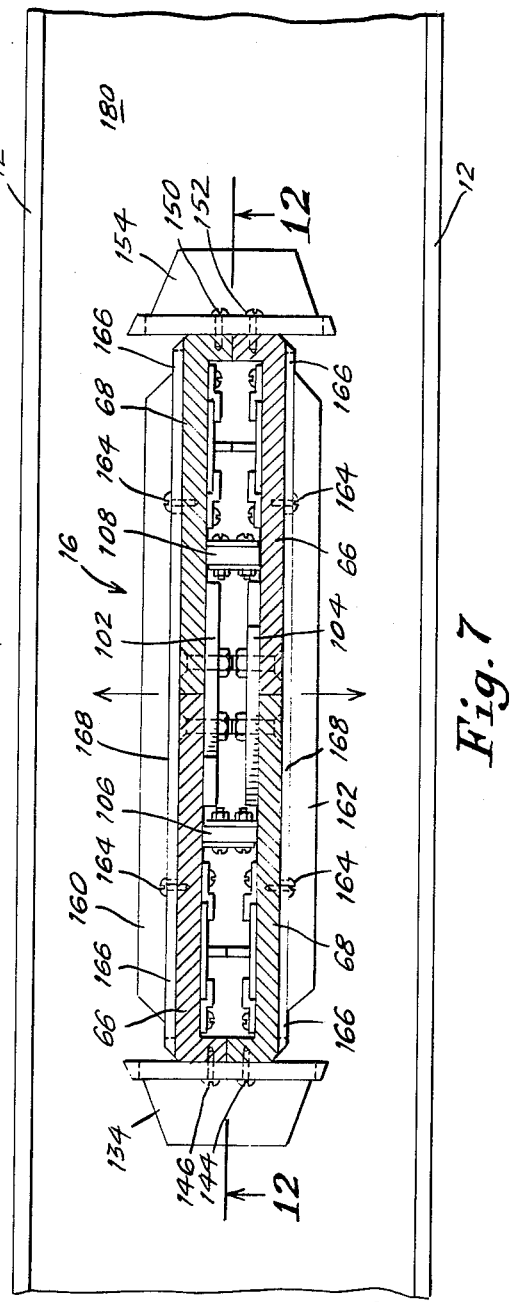

Nov. 23, 1965  N. McNIEL  3,218,774
HOLLOW REINFORCED CONCRETE BUILDING PANEL
Filed Sept. 28. 1961  11 Sheets-Sheet 5

INVENTOR
Nixon McNiel,
BY Diggins + LeBlanc
ATTORNEYS

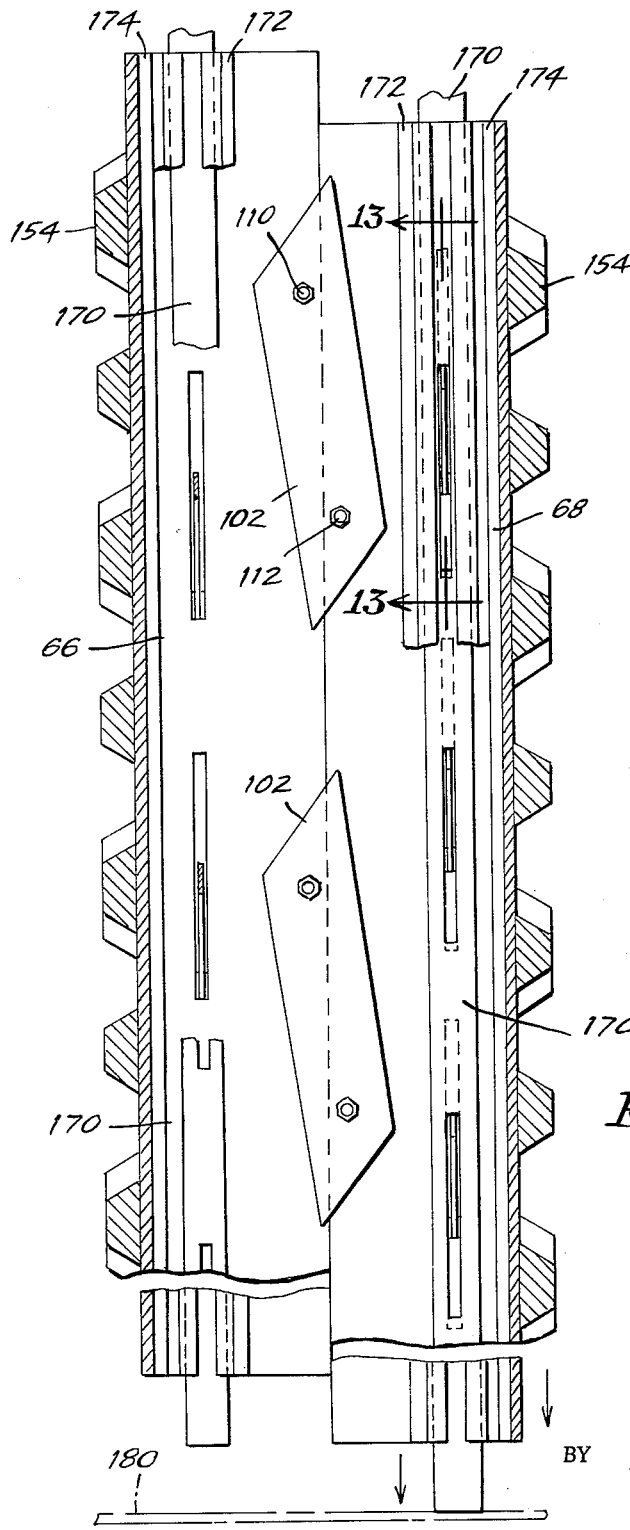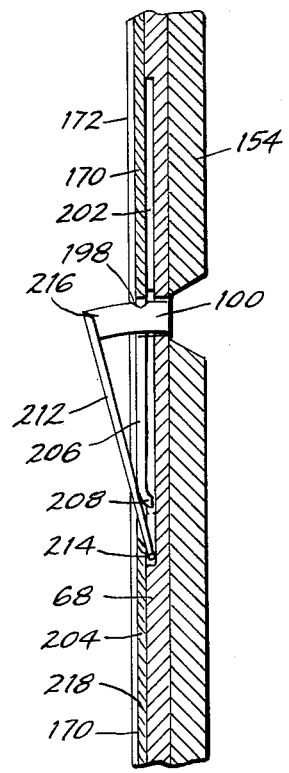

Nov. 23, 1965  N. McNIEL  3,218,774
HOLLOW REINFORCED CONCRETE BUILDING PANEL
Filed Sept. 28, 1961  11 Sheets-Sheet 7

INVENTOR
*Nixon McNiel,*

BY *Diggins + LeBlanc*

ATTORNEYS

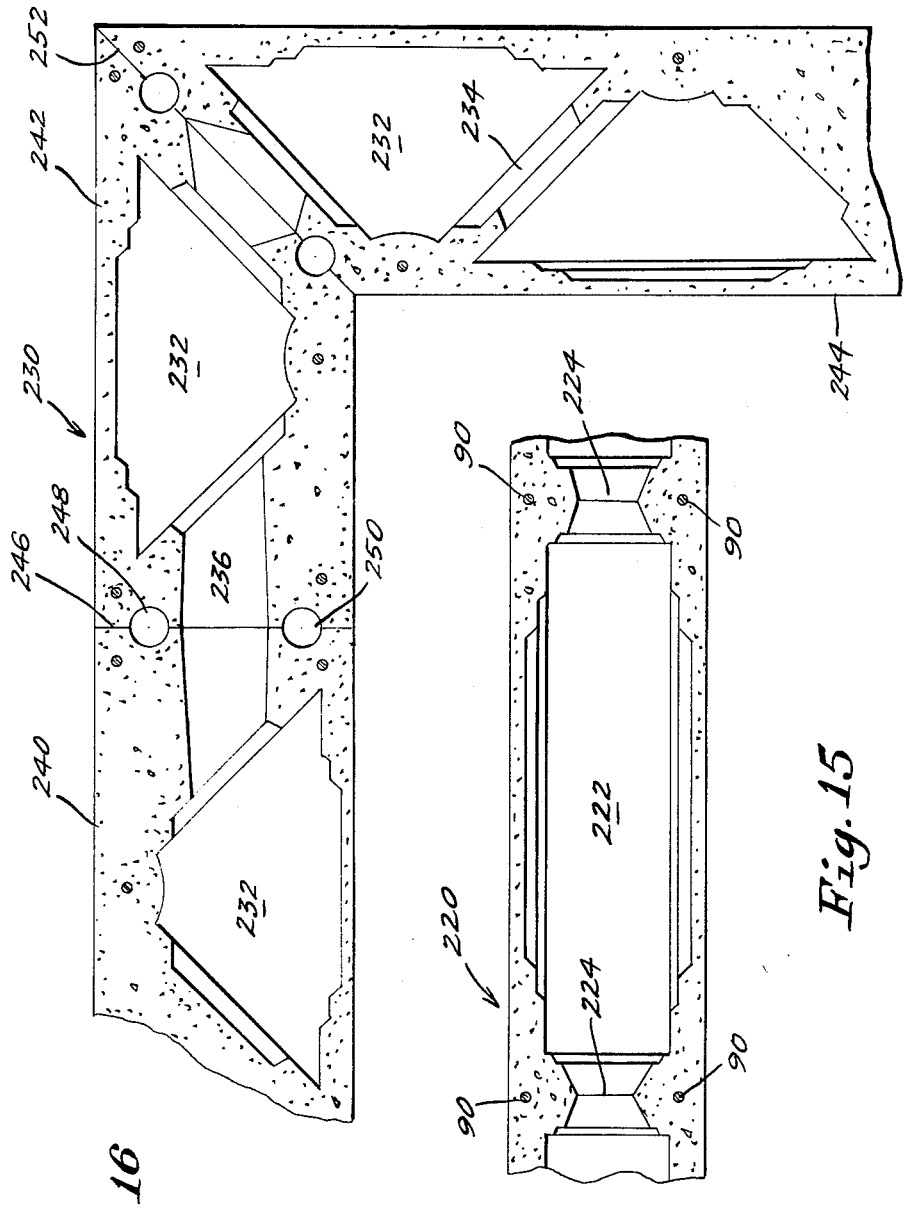

Nov. 23, 1965   N. McNIEL   3,218,774
HOLLOW REINFORCED CONCRETE BUILDING PANEL
Filed Sept. 28, 1961   11 Sheets-Sheet 9
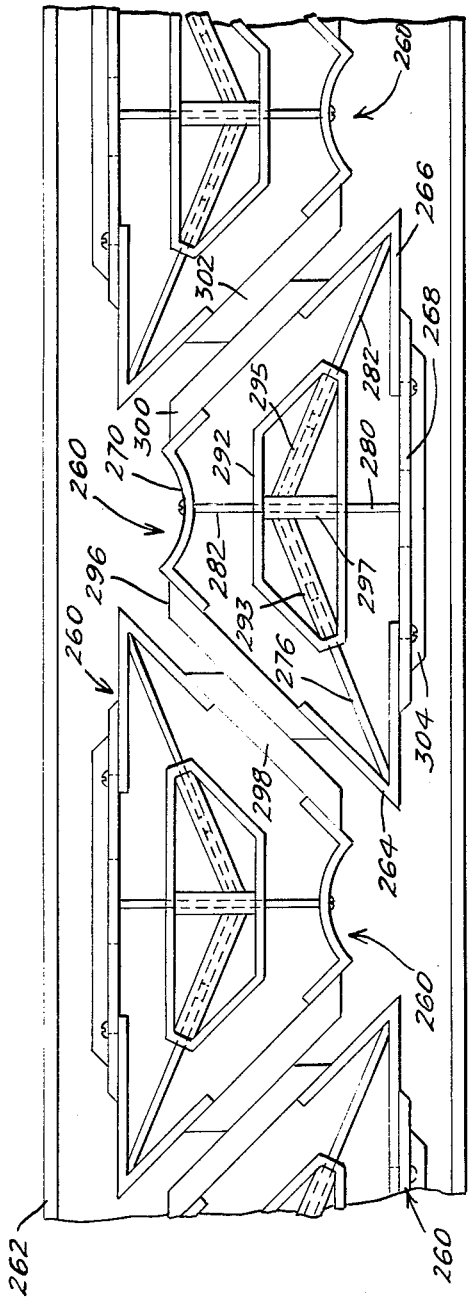
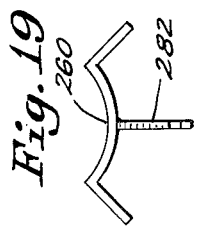
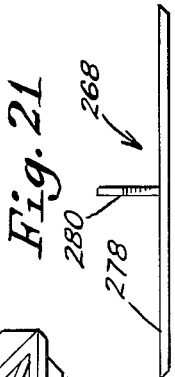
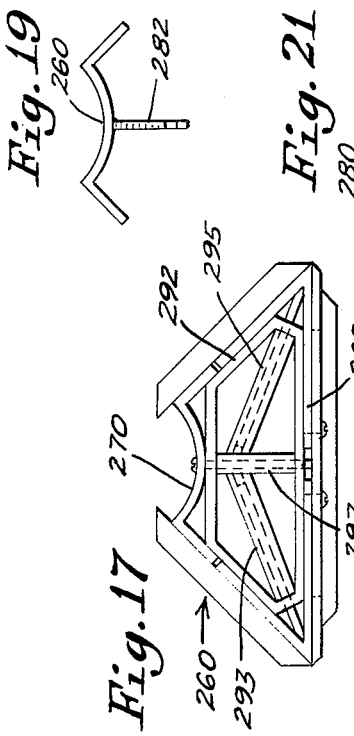
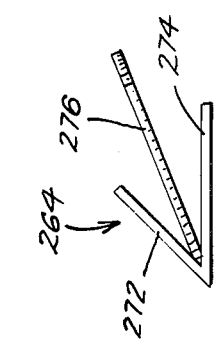
INVENTOR
Nixon McNiel,
BY Diggins + LeBlanc
ATTORNEYS

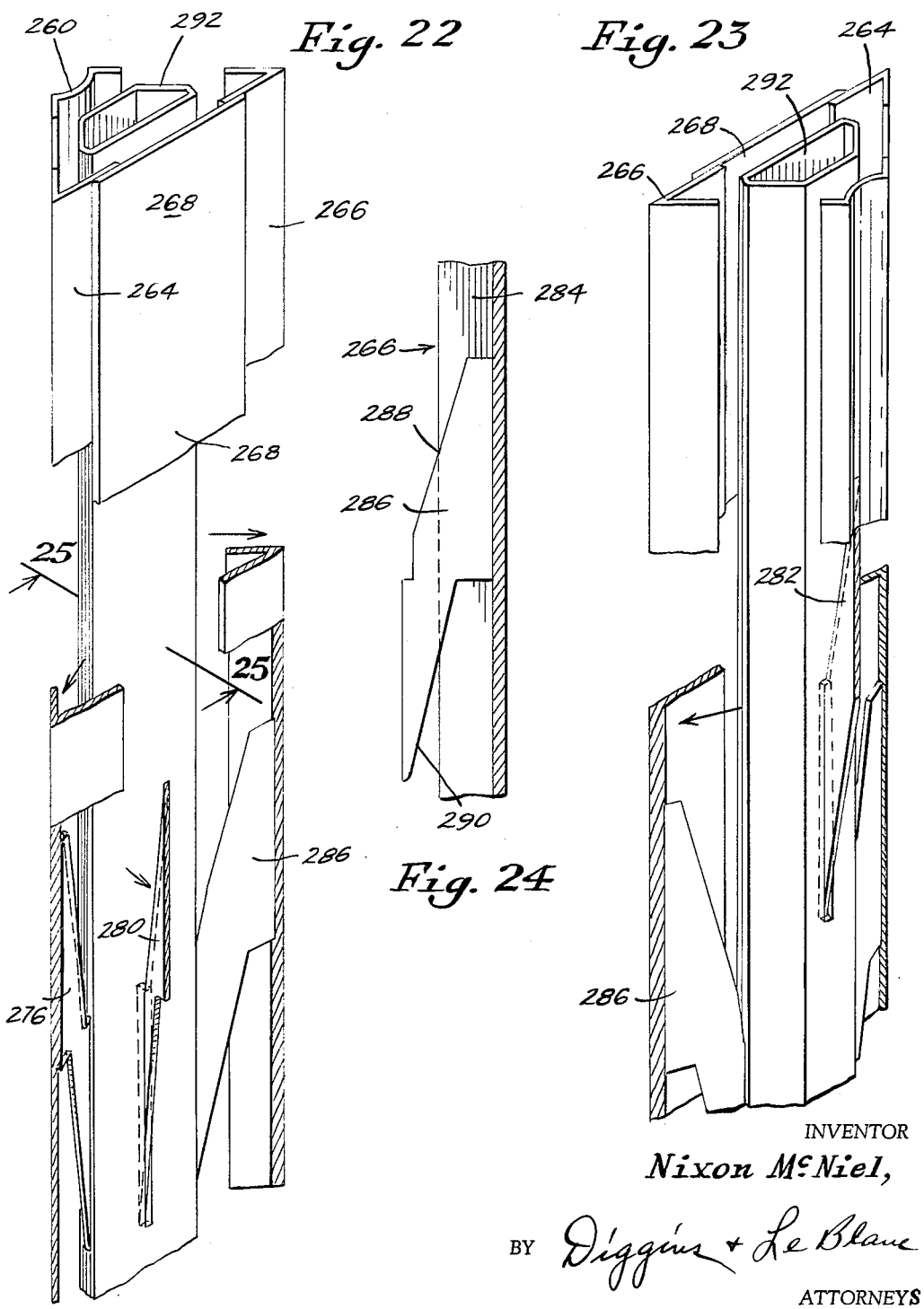

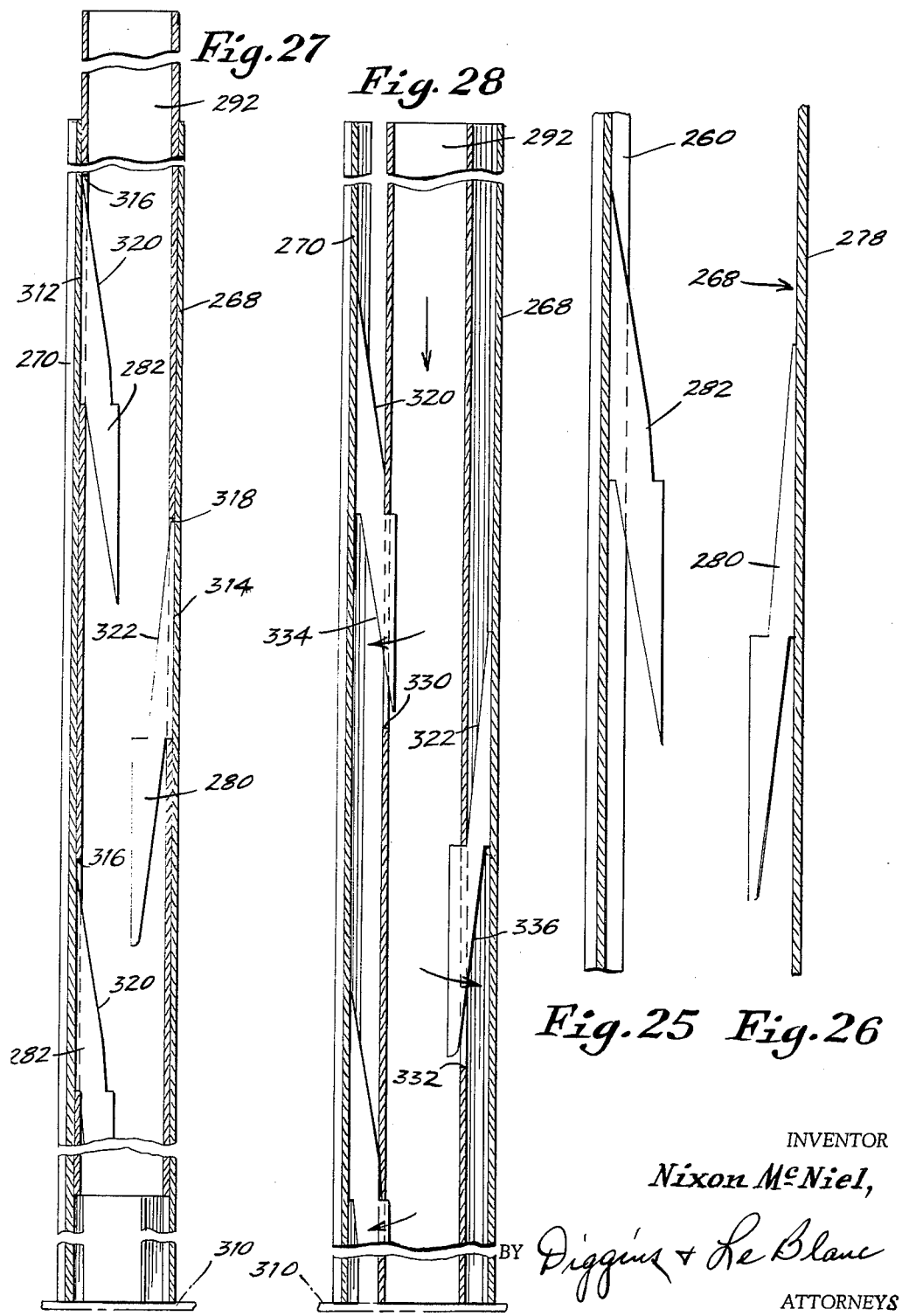

United States Patent Office 3,218,774
Patented Nov. 23, 1965

1

3,218,774
HOLLOW REINFORCED CONCRETE
BUILDING PANEL
Nixon McNiel, c/o McNiel Construction Co.,
P.O. Box 6237, Corpus Christi, Tex.
Filed Sept. 28, 1961, Ser. No. 141,415
1 Claim. (Cl. 52—602)

This invention relates to a process and apparatus for building construction and more particularly involves a collapsible mold core assembly for forming reinforced concrete walls, floors, beams and the like.

In recent years, more and more building construction has involved the use of reinforced concrete. Of particular interest has been the formation of preformed building and building block structures which may be formed to specification in the factory and assembled at the building site.

An important consideration in the production of building construction elements is the provision of air space not only for insulation purposes but for the purposes of providing preformed conduits for the passage of electrical cables, heating lines, air conditioning and the multitude of other devices normally serviced through conduits in the walls, floors and ceilings of a building.

The present invention provides a novel reinforced concrete molding assembly particularly suited for prefabricating building elements having both vertical and horizontal passageways permitting cables and conduits to be passed through the walls and ceilings of a building constructed of reinforced concrete to any desired location in the building. The collapsible core of the present invention produces a hollow concrete construction with reinforcing steel and concrete so positioned and provided as to obtain maximum strength even greater than that of a solid mass reinforced section utilizing steel in the conventional manner.

Through the practice of the present invention, construction costs can be substantially reduced while the end product obtained is equal to or superior to existing construction. By reason of the light weight of the walls, floors, ceilings, pillars and the like afforded by the present invention, the transport, handling and erection of the prefabricated elements is facilitated. Disadvantages of previous hollow type constructions are avoided by making possible moisture proof ceilings and at the same time providing hollow walls for containing electrical wiring, and plumbing, which hollow walls in themselves constitute conduits for heating and air conditioning. While prior constructions have been known to provide air spaces either in a vertical or horizontal direction, the present invention provides a construction with air passages in both directions or in a plurality of directions.

In the present invention, expandable cores are inserted between wall forms which expanded cores upon contraction leave the desired air space voids. Provision is made for the interior of the concrete sections to contain structural shaped voids and structural shaped masses of reinforced concrete. Large sections can be poured because of the diminished weight as compared with ordinary concrete construction.

While the invention is described in connection with off-site prefabrication of building elements, it is understood that the present invention is readily adaptable to on-site operation.

It is therefore a primary object of the present invention to provide a novel reinforced concrete mold assembly.

Another object of the present invention is to provide an improved method for forming reinforced concrete building elements.

Another object of the invention is to provide an improved building element.

Another object of the present invention is to provide

2 a novel collapsible core structure for forming reinforced concrete building elements.

Another object of the present invention is to provide a concrete wall, floor, pillar or the like of reinforced concrete having both vertical and horizontal passageways therein.

Another object of the present invention is to provide novel actuating means for a collapsible core.

Still another object of this invention is to provide an assembly method substantially decreasing the cost of building construction.

These and further objects and advantages of the invention will be more apparent upon reference to the following specification, claim and appended drawings wherein:

FIGURE 3 is an enlarged view of the collapsible core assembly of FIGURE 1;

FIGURE 3a is a partial section through the T-beam of FIGURE 3;

FIGURE 4 is a perspective view with parts in section illustrating a typical wall structure formed by the apparatus of FIGURE 1;

FIGURE 5 is a partial cross-section through the wall structure taken along line 5—5 of FIGURE 4;

FIGURE 6 is a partial cross-section taken along line 6—6 of FIGURE 4;

FIGURE 7 is a plan view of a portion of the core assembly of FIGURE 1 with the collapsible core in retracted position;

FIGURE 8 is a plan view similar to FIGURE 7 with the collapsible core in expanded position;

FIGURE 11 is an enlarged view of a portion of the core section of FIGURES 9 and 10 in contracted position;

FIGURE 13 is an enlarged partial cross-section through the reinforcing wire retainer of the core assembly of the present invention showing it in retracted position;

FIGURE 15 is a plan view of the resulting wall product formed by the mold form assembly of FIGURE 1;

FIGURE 16 is a plan view of a wall junction formed by a modified expandable core assembly;

FIGURE 17 is a plan view of a modified core assembly used to produce the wall structure of FIGURE 16 showing the core in contracted position, FIGURE 18 is a plan view showing a plurality of modified cores in expanded position;

FIGURES 19–21 are plan views of three of the movable elements of the expandable core of FIGURES 17 and 18;

FIGURE 22 is a perspective view with parts in section showing the actuation of the expandable cores of FIGURES 17 and 18;

FIGURE 23 is a perspective view with parts in section showing the other side of the core assembly of FIGURE 22;

FIGURE 24 is an enlarged view of one of the actuator elements of the expandable core;

FIGURES 25 and 26 are enlarged views of the other actuator elements of the cores;

FIGURE 27 shows the modified core in contracted position; and

FIGURE 28 shows the modified core of FIGURES 17 and 18 in expanded position.

Figure 1:
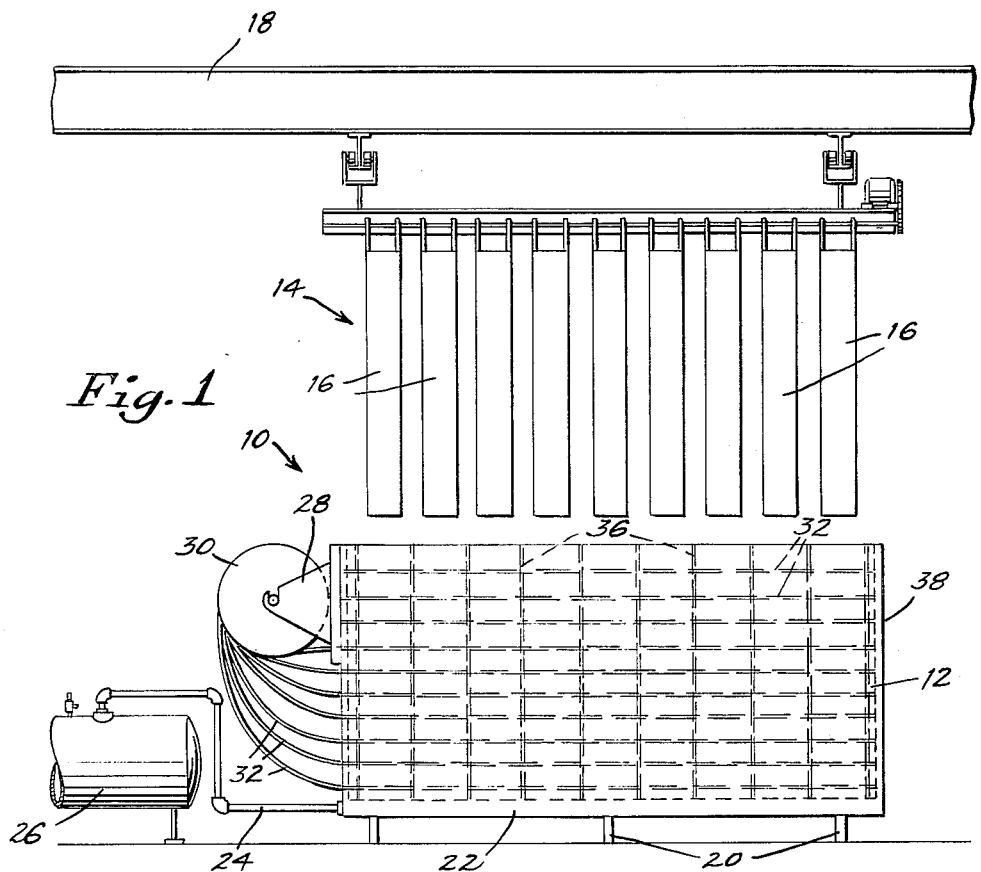
FIGURE 1 is an elevational view showing in schematic arrangement the collapsible cores and mold form assembly of the present invention.

Referring to the drawings, FIGURE 1 illustrates the novel core assembly of the present invention generally indicated at 10 comprising a mold 12 and a core assembly 14 including individual collapsible cores 16. Cores 16 depend from a suitable support such as I beam 18 and are vertically movable so as to enable cores 16 to be lowered into the generally rectangular shaped mold 12.

Mold 12 comprises a plurality of supporting legs 20 terminating in a hollow base 22 which base communicates with a steam line 24 to which is supplied steam or other suitable heating fluid from fluid supply tank 26.

Supported at one end of mold 12 from a bracket 28 is a reel 30 carrying a plurality of reinforcing wires or cables 32.

In FIGURE 1 the core assembly 16 is shown raised above the mold 12. Dashed lines 32 and 36 illustrate the positions of the criss-crossing reinforcing wires within the mold 12. Once the cores are lowered into the mold and expanded, reinforcing wires 32 and 36 are threaded by hand through the mold which is provided with suitable apertures permitting passage of the reinforcing wires longitudinally through the entire mold and core assembly to the right-hand end 38 of the mold. Novel retractable wire retainers are provided on the cores which are more fully discussed below for supporting the reinforcing wires within the mold 12.

FIGURE 3 is an enlarged view of the core assembly 14 of FIGURE 1 illustrating the core assembly as supported from the I beam 18 by a pair of pully units 40 and 42. The core assembly 14 may be raised and lowered by actuation of the respective pulley wires 44 and 46 for insertion into the mold 12 of FIGURE 1.

The individual core sections 16 are supported from an elongated T-beam 48 having a central vertical web 50 and an upper span 52 forming a generally T-shaped cross-section. Mounted on beam 48 is a vibrator drive motor 54 coupled by means of suitable gearing 56 to a pair of crank shafts 58 and 60. The crank shafts are supported in pairs of bearings 62 and 64 at each end. It is apparent that actuation of motor 54 causes each of the crank shafts 58 and 60 to rotate through an eccentric path within their respective bearings.

Each of the collapsible core sections 16 includes a pair of vertically movable actuator rods each labelled 66 and a pair of stationary rods each labelled 68. These rods extend upwardly from approximately the four corners of each of the mold sections with the actuator or drive rods 66 extending upwardly a greater distance above stationary rods 68. The actuator rods 66 occur at opposite diagonal corners of each core section and, as illustrated in FIGURE 3a are provided with horizontal slots 70 for engaging one of the two crank shafts 58 and 60.

For purposes more fully described below, it is desirable to actuate the crank shafts so as to impart a vertical motion to the actuator rods 66 of the respective core sections to provide a small vertical motion to these rods by way of slots 70. As is apparent from FIGURE 3, each of the mold sections is vibrated or actuated from opposite diagonal corners by means of the respective drive rods 66 while the rods 68 remain stationary and are not engaged by the crank shaft.

Figure 2:
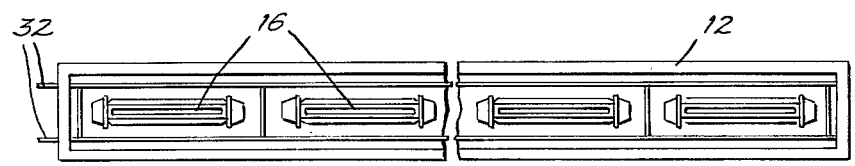
FIGURE 2 is a plan view of the mold assembly of FIGURE 1.

FIGURE 4 is a perspective view of a typical structural element produced by the mold assembly of FIGURES 1–3. In FIGURE 4, parts are shown broken away and parts are in section for greater ease of illustration. Reinforced concrete element 80 in FIGURE 4 will be described as a wall section for a house or building but it is understood that the invention is not limited to the formation of wall structures alone but may be utilized to form floors, ceilings, pillars and any other desired type of reinforced concrete structural element. Wall 80 comprises an inner reinforced concrete slab 82 and an outer slab 84 each provided with vertical reinforcing ribs 86 and horizontal ribs 88. Embedded in the vertical ribs 86 are reinforcing wires 90 and similar reinforcing wires 92 are embedded in the corresponding horizontal ribs 88.

Spanning the inner and outer slabs 82 and 84 from vertical ribs 86 are a plurality of transverse ribs or webs 94. Likewise embedded within transverse ribs 94 and secured to the vertical reinforcing wires 90 are transverse zig-zag reinforcing wires 96 which are embedded in and pass through the center of the zig-zag transverse webs 94. The zig-zag webs 94 define triangular apertures 98 extending horizontally completely along from one end to the other of wall 80.

FIGURES 7 and 8 show plan views of one of the collapsible core sections 16 with the actuator or drive rods 66 and the stationary rods 68 in section. In FIGURE 7, the core is shown in collapsed form while in FIGURE 8, the same core is shown in expanded form within the mold 12. The mold cores are inserted into the mold 12 in collapsed form shown in FIGURE 7 and then expanded to the shape illustrated in FIGURE 8. Horizontal reinforcing wires 92 are subsequently strung through the mold assembly and secured by short links 98 to vertical reinforcing wires 90. Horizontal reinforcing wires 92 are supported from the mold core by retainers 100 which retract into the mold core when it is collapsed in a manner more fully described below.

Secured to the corner members or rods 66 and 68 are four pivot arms 102, 104, 106 and 108. Pivot arm 102 is pivotally secured to actuator rod 66 by a pivot pin 110 and similarly to stationary rod 68 by pivot pin 112. Pivot arm 104 is similarly pivoted by means of pins 114 and 116 to its respective drive rod 66 and stationary rod 68.

Secured to the left-most rods 66 and 68 are a pair of metal brackets 118 and 120 carrying pivot pins 122 and 124 pivotally received through pivot arm 106. Similar brackets 126 and 128 are connected by pivot pins 130 and 132 to pivot arm 108. While only one set comprising four pivot arms 102, 104, 106 and 108 is illustrated, it is understood that similar sets of four pivot arms occur periodically along the length of the rods 66 and 68 which extend entirely from the top to the bottom of mold 12 as is more apparent from FIGURES 9–12.

At spaced points along their length, the left-hand rods 66 and 68 are connected to end bosses 134 which are adapted to engage similar bosses 136 shown in phantom on adjacent cores to form the horizontal continuous channels through the concrete wall structure. Bosses 134 are provided with peripheral flanges 138 having slots indicated by dashed lines at 140 and 142. Pins 144 and 146 pass through the respective slots 140 and 142 to secure the boss 134 to the rods 66 and 68. Relative movement between arms 66 and 68 on the one hand and boss 134 causes the pins 144 and 146 to slide along the slots 142 and 140 from the position shown in FIGURE 7 to the position shown in FIGURE 8. Similar pins 150 and 152 secure the right-hand bosses, one of which is illustrated at 154, to the right-hand rods 66 and 68 and are slidable in similar grooves indicated by dashed lines at 156 and 158.

Side bosses 160 and 162 are similarly secured for relative sliding movement to the vertical rods 66 and 68 by pins 164 slidable in similar slots indicated by dashed lines at 166 formed in peripheral flanges 168.

Retainers 100 are extended and retracted by vertical actuators 170 slidable in side brackets 172 and 174.

Figure 9:
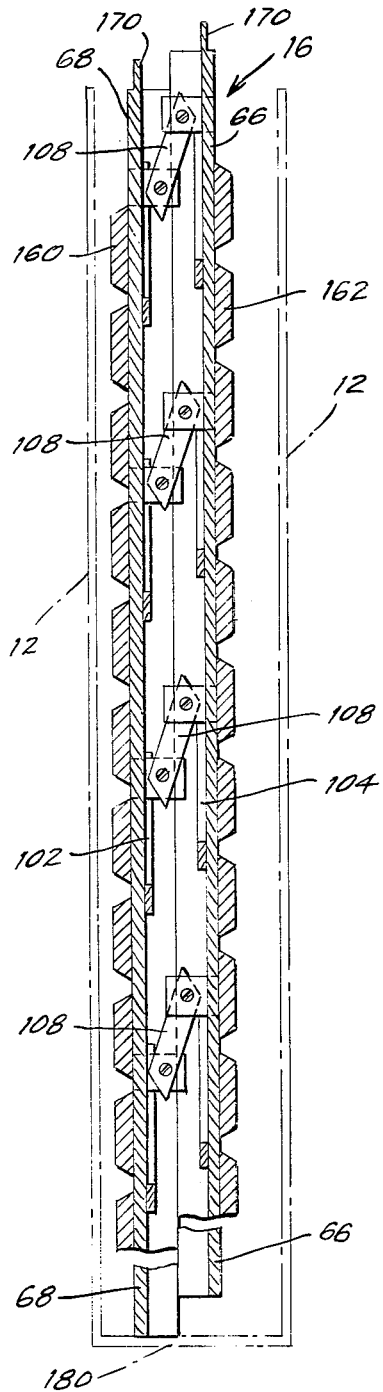
FIGURE 9 is a vertical cross-section through a core section in contracted position.
Figure 10:
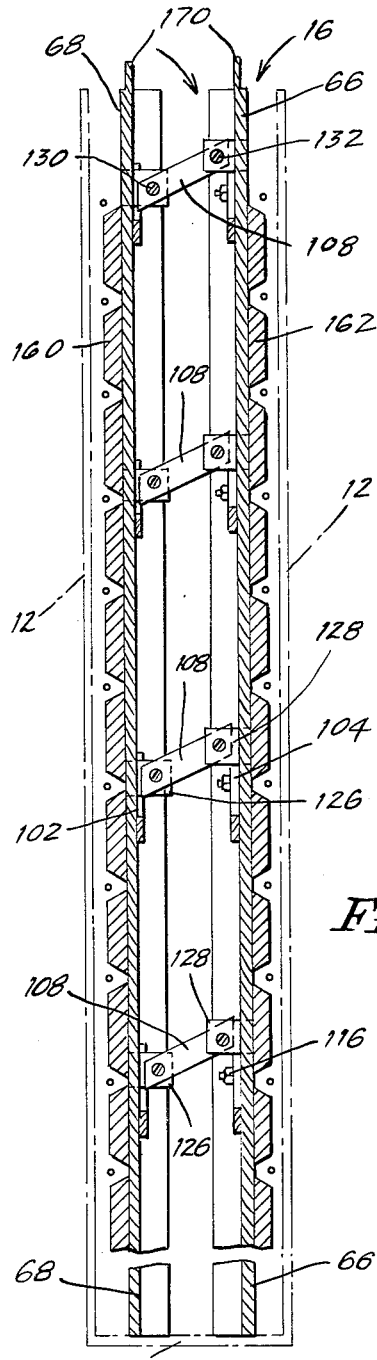
FIGURE 10 is a vertical cross-section through the same section in expanded position.

FIGURES 9 and 10 illustrate the expanding action of the cores, FIGURE 9 again showing the core 16 in contracted position and FIGURE 10 showing the same core section in expanded position.

As illustrated in FIGURE 9, the core section 16 is initially lowered into the mold 12 in the contracted position until the stationary rod 68 touches the floor 180 of the mold 12. By then forcing the drive rods 66 downwardly pivot arms 108 are caused to pivot about pins 130 and 132 causing the vertical rods 66 and 68 to separate to the position illustrated in FIGURE 10. This causes the core to expand laterally across the width of the mold 12. When the bottom of the actuator rod 66 touches the base 180 of mold 12 the core is fully expanded.

Figure 12:
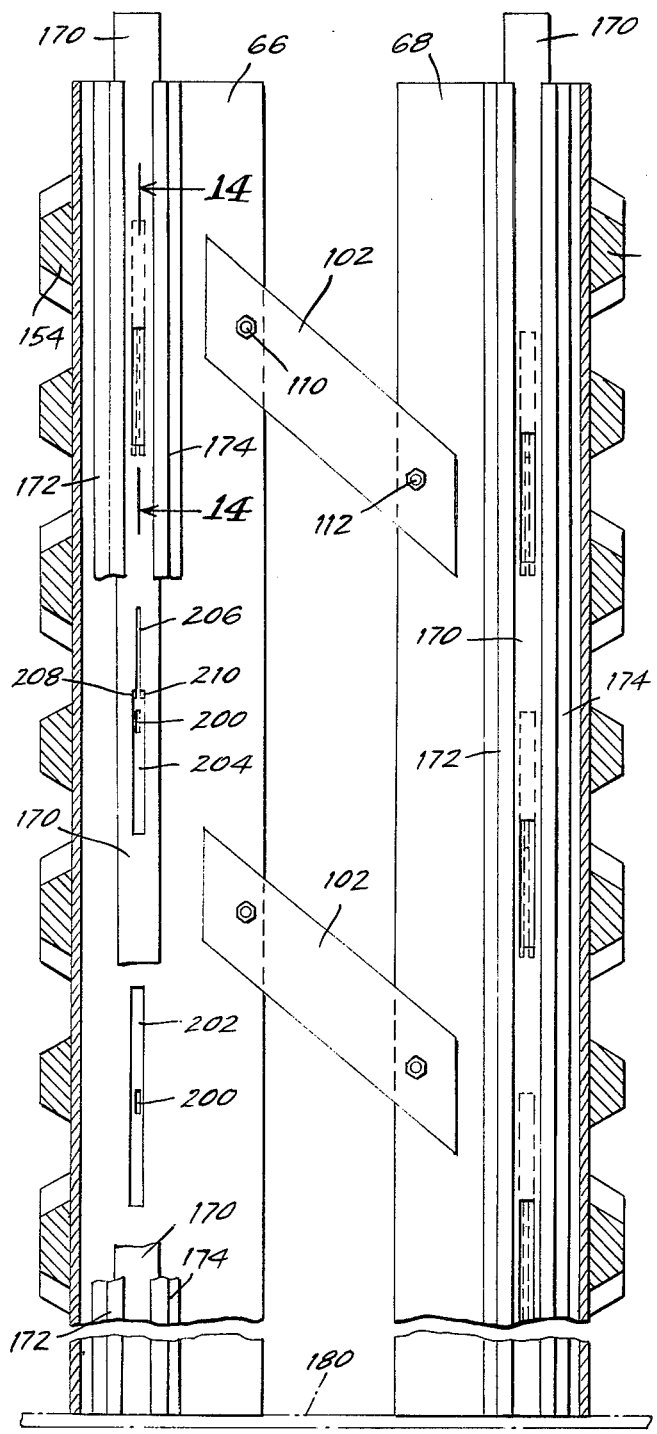
FIGURE 12 is a similar view showing the core section in expanded position.

FIGURES 11 and 12 are enlarged cross sectional views taken at right angles to the cross-sections of FIGURES 9 and 10. FIGURE 11 shows the core in contracted position and FIGURE 12 shows the same view with the core in expanded position. In operation the stationary rod 68 touches the base 180 of the mold and the application of the downward force on actuator rod 66 causes the core to expand laterally with pivot arms 102 rotating about pivot pins 110 and 112. When the actuator arm 66 touches the base 180 the core is then in fully expanded position.

Figure 14:
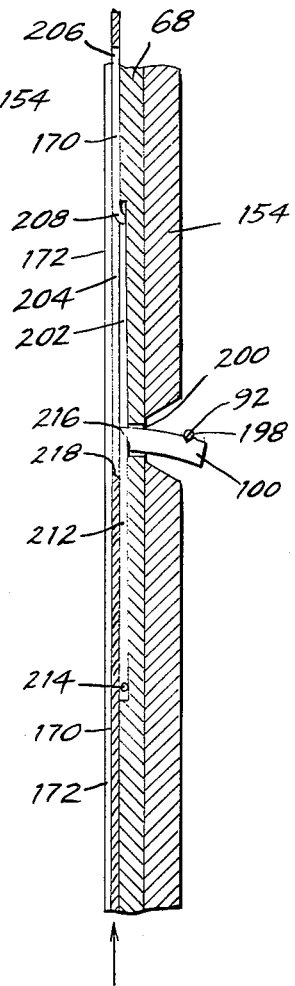
FIGURE 14 is a similar view of the reinforcing wire retainer in extended position.

FIGURES 13 and 14 illustrate the operation of retainers 100 used to support the reinforcing wires 92. In FIGURE 13 a retainer 100 is shown in retracted position and in FIGURE 14 the same retainer is shown in extended position. The retainers are formed with V-shaped grooves or notches 198 and project through suitable apertures 200 formed in the bottom of grooves 202 in the vertical rods 66 and 68.

Vertical actuator bars 170 are provided with slots having a wider portion 204 and a narrower portion 206 passing therethrough. At the end of the narrow portion 206 of the slot are two turned down shoulders 208 and 210 which shoulders upon movement in a vertical direction of actuator bar 170 slide in slot 202.

Retainers 100 are carried by pivot arms 212, pivoted at their extreme ends 214. When the retainers are in the fully extended position shown in FIGURE 14, pivot arm 212 rests in the lower half of slot 202.

With the core completely expanded the actuator bars 170 are pushed downwardly to retract the retainers from the concrete so that shoulders 208 and 210 engage a pair of slanted surfaces 216 on the end of the pivot arm 212. Further downward movement of actuators 170 cause the slanted surfaces 216 to ride over the top of shoulders 208 and 210 and the actuator 170 drives the pivot arms inwardly of the core to retract the retainers into the position shown in FIGURE 13.

To extend the retainers 100 it is necessary to pull upwardly on the actuators 170 so that the slanted edge 218 at the end of enlarged slot 204 engages the upper surface of the pivot arm to drive the retainer 100 outwardly of the core into the extended position shown in FIGURE 14. It is understood that movement of the actuators 170 and hence the extension and retraction of the reinforcing cable support members or retainers is completely independent from the expansion and contraction of the cores themselves in that the cable supports require separate actuators 170.

FIGURE 15 shows a section of wall 220 formed by the expansible core and mold of FIGURES 1 through 14. The wall member 220 includes vertical reinforcing rods 90, vertical passageway 222 left by the cores 16 and communicating horizontal passageways 224 left by the bosses 134 and 154 of the cores.

FIGURE 16 shows a wall section 230 constructed in accordance with another embodiment of the present invention and also incorporating both vertical and horizontal passageways internally of the reinforced concrete structure. The vertical passageways 232 are generally of triangular cross section and communicate by way of horizontal passageways 234 and 236. The various sections 240, 242, and 244, illustrate various different constructions which may be produced by the modified core assembly. Section 240 is joined to section 242 along joint line 246 including grout holes 248 and 250. Section 242 is similarly joined to section 244 along corner line 252 including similar grout holes. Various core sizes and shapes may be utilized with different mold designs to produce the various sections illustrated in FIGURE 16.

FIGURE 17 illustrates an expandible core 260 utilizable in forming sections similar to section 244 of FIGURE 16. A plurality of the collapsible cores 260 are illustrated in FIGURE 18 as received within a surrounding mold 262. The cores 260 are illustrated in FIGURE 17 in contracted position and in FIGURE 18 in expanded position.

Each of the cores 260 comprises a pair of corner rods 264 and 266, a base rod 268 and an apex rod 270. Corner rod 264 is illustrated in FIGURE 20 and comprises a pair of vertical flanges 272 and 274 formed in the shape of a V-channel with spaced cam plates one of which is illustrated at 276 bisecting the angle formed by the flanges 272 and 274. Base member 268 shown in FIGURE 21 comprises a flat rod 278 to which is attached spaced cam plates 280. Apex rod 260 shown in FIGURE 19 is similarly connected to spaced cam plates 282.

FIGURE 24 shows in partial elevation corner rod 226 which is similar in construction to the other corner rod 264 comprising the V-shaped vertical member 284 to which are connected cam plates, one of which is illustrated in FIGURE 24 at 286. Plate 286 includes a pair of cam surfaces or edges 288 and 290 which engage slots formed in the central actuator tube 292 illustrated in FIGURES 17 and 18. Base member 268 includes flat plate 278, and spaced cams 280 is illustrated in FIGURE 26 while apex member 260 and one of the spaced cam members 282 is illustrated in FIGURE 25. Slideably secured to corner rod 264 and apex rod 260 are projections 296 which abut similar projections 298 in FIGURE 18 to form horizontal passageways 234 illustrated in FIGURE 15. Similar projections 300 are secured to apex rod 260 and the other corner rod 266 in slidable relation and abut a similar projection 302 on the adjacent core to form a similar horizontal passageway through the resulting reinforced structure.

Corner rods 264 and 266 similarly slidably engage base rod 268 which carries projections 304 rigidly secured thereto. FIGURES 27 and 28 illustrate the modified expansible core assembly in retracted and expanded position respectively.

FIGURE 27 shows the apex rod 270 and base rod 268 resting on mold base 310 with spaced cam plates 282 and 280 passing through suitable elongated apertures 312 and 314 formed in the side walls of the actuator tube 292. The actuator tube 292 is illustrated in FIGURE 27 as in the raised position with the upper edges 316 and 318 of the tube slots engaging the cam surfaces 320 and 322 of the cam plates 282 and 280 respectively.

In FIGURE 28 actuator tube 292 has been forced downwardly to the fully expanded position where the bottom of the actuator tube contacts the base 310 of the mold. Engagement of edges 316 and 318 of the slots with the respective cam surfaces 320 and 322 forces apex rod 270 and base rod 268 outwardly away from the tube 292 into the fully expanded position.

It is apparent that in order to retract the core actuator tube 292 is raised so that the bottom edges 330 and 332 of the slots engage the lower camming edges 334 and 336 of the cam plates and that further upward movement of actuator tube 292 to the position shown in FIGURE 27 draws the bars inwardly to the retracted position by the force exerted on camming edges 334 and 336 by the lower edges of the tube slots. Actuation of the corner bars 264 and 266 occurs simultaneously in the same manner by means of the camming plates 276 and 286 received through similar elongated slots in the actuator tube. Suitable guides 293, 295 and 297 may be provided internally of actuator tube 292 to guide the movement of the cam plates through the slots.

It is apparent from the above that the present invention provides a novel process and assembly for producing reinforcing concrete structures of any desired size and shape having both vertical and horizontal air passageways. The mold assembly of the present invention includes two embodiments of an expandable core construction wherein all actuation is brought about by vertical movement originated at the top of the assembly. In both embodiments the core is inserted into the mold and expanded by pushing down suitable actuators until the actuators touch the mold base. When this is accomplished the cores are completely expanded and contact is made through various shaped projections against adjacent expanded cores to form horizontal passageways in the resulting product. In the same manner, vertical actuation from the above causes support arms or retainers to be projected from the collapsible cores for the purposes of supporting horizontal reinforcing wires to be embedded in the resulting product. The concrete is then poured into place between the collapsible cores and the surrounding mold and as illustrated in FIGURE 3 may be vibrated by imparting a horizontal vibratory motion to actuators 66 to cause repeated partial expansion and contraction of the cores to help compact the concrete.

Suitable heating fluid such as steam may be passed through the hollow bottom of the mold base for the purposes of curing the concrete with the reinforcing wires embedded therein. Once the concrete is cured the molds are collapsed by drawing upwardly on the actuating members or rods and similarly the support members are retracted through vertically movable actuating rods 170. Once collapsed the mold cores are withdrawn to leave the resulting reinforced concrete structure with vertical and horizontal passageways therein which structure can be subsequently removed from the surrounding mold. Suitable parting agents may be used as desired.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A molded, reinforced structural panel of monolithic construction comprising two spaced slabs of cementitious material having a plurality of laterally extending reinforcing ribs formed on adjacent surfaces thereof, said reinforcing ribs extending substantially horizontally and vertically across the surfaces of said slabs, elongated reinforcing means spanning said slabs and embedded within said reinforcing ribs, means interconnecting said elongated reinforcing means in said horizontal ribs with said reinforcing means embedded in said vertical ribs, a plurality of webs of cementitious material integral with said slabs, each such web extending diagonally from said vertical reinforcing ribs across the space between said slabs, and elongated reinforcing means embedded in said webs of cementitious material, said webs of cementitious material defining a plurality of substantially parallel conduits extending horizontally through said panel between said slabs, and a plurality of substantially parallel conduits extending vertically through said panel between said slabs, the reinforcing means embedded in said webs being interconnected with the reinforcing means embedded in said vertical reinforcing ribs to provide improved slab reinforcement.

References Cited by the Examiner

UNITED STATES PATENTS

| | | | |
|---|---|---|---|
| 960,562 | 6/1910 | Lanning | 52—607 |
| 1,128,020 | 2/1915 | McIntyre | 52—607 |
| 1,162,961 | 12/1915 | Williams | 25—128.1 X |
| 1,215,872 | 2/1917 | Salvatierra-Iriarte | 52—650 X |
| 1,584,019 | 5/1926 | Doving | 52—380 |
| 1,637,708 | 8/1927 | Porter | 25—128.1 X |
| 1,713,789 | 5/1929 | Strom | 52—424 |
| 1,963,980 | 6/1934 | Garrett | 52—383 X |
| 2,043,697 | 6/1936 | Deichmann | 52—602 X |
| 2,058,285 | 10/1936 | Amescua | 52—602 X |
| 2,138,683 | 11/1938 | Weesner | 52—381 X |
| 2,144,630 | 1/1939 | Kotrbaty | 52—275 |
| 2,244,107 | 6/1941 | Hayes | 25—128.1 |
| 2,434,708 | 1/1948 | Mathis | 52—380 X |
| 2,451,167 | 10/1948 | Johnson | 25—45 |
| 2,542,874 | 2/1951 | Locatelli | 25—45 |
| 2,567,549 | 9/1951 | Christensen. | |
| 2,655,710 | 10/1953 | Roensch et al. | 25—154 |
| 2,706,322 | 4/1955 | Davies et al. | 25—155 |
| 2,892,339 | 6/1959 | Flower et al. | 52—337 X |

FOREIGN PATENTS

| | | |
|---|---|---|
| 585,287 | 2/1947 | Great Britain. |
| 311,181 | 9/1933 | Italy. |

FRANK L. ABBOTT, *Primary Examiner.*

WILLIAM J. STEPHENSON, JACOB L. NACKENOFF, HENRY C. SUTHERLAND, *Examiners.*